United States Patent
Karam et al.

(10) Patent No.: US 9,795,963 B2
(45) Date of Patent: Oct. 24, 2017

(54) METHOD AND APPARATUS FOR TAPED INTERLAYER FLOW CELL WITH MASKING AND CONDUCTIVE TRACES

(71) Applicant: Picosys Incorporated, Santa Barbara, CA (US)

(72) Inventors: Raymond M. Karam, Santa Barbara, CA (US); Georges Roussos, San Jose, CA (US); Anthony T. Chobot, Goleta, CA (US)

( * ) Notice: Subject to any disclaimer, the term of this patent is extended or adjusted under 35 U.S.C. 154(b) by 0 days.

(21) Appl. No.: 14/498,003

(22) Filed: Sep. 26, 2014

(65) Prior Publication Data

US 2016/0089671 A1 Mar. 31, 2016

(51) Int. Cl.
*B01L 3/00* (2006.01)
*C23F 1/00* (2006.01)
(Continued)

(52) U.S. Cl.
CPC .......... *B01L 3/502707* (2013.01); *B32B 3/04* (2013.01); *B32B 3/263* (2013.01); *B32B 3/266* (2013.01); *B32B 7/06* (2013.01); *B32B 7/12* (2013.01); *B32B 9/005* (2013.01); *B32B 9/041* (2013.01); *B32B 9/045* (2013.01); *B32B 15/08* (2013.01); *B32B 15/18* (2013.01); *B32B 15/20* (2013.01); *B32B 27/06* (2013.01); *B32B 27/08* (2013.01); *B32B 27/281* (2013.01); *B32B 27/285* (2013.01); *B32B 27/304* (2013.01);
(Continued)

(58) Field of Classification Search
CPC ......... B01L 2200/12; B01L 2300/0887; B01L 3/502707; B01L 2300/0645; B01L 2400/0415; C23F 1/00; B32B 15/08; B32B 15/18; B32B 15/20; B32B 2255/00; B32B 2255/10; B32B 2255/205; B32B 2307/412; B32B 2307/546; B32B 307/58; B32B 2307/748; B32B 27/06; B32B 27/08; B32B 27/281; B32B 27/285; B32B 27/304; B32B 27/36; B32B 27/40; B32B 3/04; B32B 3/263; B32B 3/266; B32B 7/06; B32B 7/12; B32B 9/005; B32B 9/041; B32B 9/045
See application file for complete search history.

(56) References Cited

U.S. PATENT DOCUMENTS 6,672,502 B1  1/2004 Paul et al.
9,492,990 B2 * 11/2016 Karam .................... B32B 37/06
(Continued)

FOREIGN PATENT DOCUMENTS

DE  EP 2368637 A1 *  9/2011  ........ B01L 3/502715
EP     2368637 B1    11/2013

OTHER PUBLICATIONS

Micronit Microfluidics, "Fluidic connect 4515 chipholder", Micronit, 2010.
(Continued)

Primary Examiner — Jennifer Wecker
(74) Attorney, Agent, or Firm — Felix L. Fischer

(57) ABSTRACT

A flow cell incorporates a first substrate with a metal layer on one surface. A tape layer having flow channels is adhered to the first substrate. A second substrate having a second metal layer on one surface is adhered to the tape layer opposite the first substrate. At least one of the first and second metal layers includes mating cutouts to at least partially expose the flow channels.

9 Claims, 14 Drawing Sheets

(51) Int. Cl.
  *B32B 37/12*    (2006.01)
  *B32B 7/06*     (2006.01)
  *B32B 7/12*     (2006.01)
  *B32B 9/00*     (2006.01)
  *B32B 9/04*     (2006.01)
  *B32B 15/08*    (2006.01)
  *B32B 15/18*    (2006.01)
  *B32B 15/20*    (2006.01)
  *B32B 27/06*    (2006.01)
  *B32B 27/08*    (2006.01)
  *B32B 27/28*    (2006.01)
  *B32B 27/30*    (2006.01)
  *B32B 27/36*    (2006.01)
  *B32B 27/40*    (2006.01)
  *B32B 3/04*     (2006.01)
  *B32B 3/26*     (2006.01)
  *B32B 37/00*    (2006.01)
  *H01L 21/02*    (2006.01)

(52) U.S. Cl.
  CPC ............. *B32B 27/36* (2013.01); *B32B 27/40* (2013.01); *C23F 1/00* (2013.01); *B01L 2200/12* (2013.01); *B01L 2300/0645* (2013.01); *B01L 2300/0887* (2013.01); *B01L 2400/0415* (2013.01); *B32B 2255/00* (2013.01); *B32B 2255/10* (2013.01); *B32B 2255/205* (2013.01); *B32B 2307/412* (2013.01); *B32B 2307/546* (2013.01); *B32B 2307/58* (2013.01); *B32B 2307/748* (2013.01)

(56) References Cited

U.S. PATENT DOCUMENTS

| | | | |
|---|---|---|---|
| 2002/0098114 A1* | 7/2002 | Harding | B01L 3/5027 422/400 |
| 2005/0272142 A1* | 12/2005 | Horita | B01L 3/502707 435/287.1 |
| 2009/0114293 A1* | 5/2009 | Kanai | B01L 3/502707 137/561 R |
| 2010/0296972 A1* | 11/2010 | Miura | F04B 19/006 422/63 |
| 2011/0207328 A1* | 8/2011 | Speakman | H01L 51/0016 438/694 |
| 2012/0322239 A1* | 12/2012 | Singh | H01L 21/78 438/462 |
| 2013/0034467 A1* | 2/2013 | Johnstone | B81C 1/00182 422/68.1 |
| 2014/0179909 A1* | 6/2014 | O'Halloran | B01L 3/502707 536/25.41 |

OTHER PUBLICATIONS

Van Heeren, Henne, "Microfluidics, it's all about interconnections!", Aug. 23, 2011.

* cited by examiner

METHOD AND APPARATUS FOR TAPED INTERLAYER FLOW CELL WITH MASKING AND CONDUCTIVE TRACES

REFERENCE TO RELATED APPLICATIONS

This application is copending with U.S. application Ser. No. 13/291,956 filed Nov. 8, 2011 entitled ROOM TEMPERATURE GLASS-TO-PLASTIC AND GLASS-TO-CERAMIC/SEMICONDUCTOR BONDING having a common assignee with the present application, the disclosure of which is incorporated herein by reference.

BACKGROUND INFORMATION

Field

Embodiments of the disclosure relate generally to the field of taped interlayer flow cells and more particularly to a method and structure for producing a taped interlayer flow cell with precision tape geometry and cell assembly including masking of the tape layer and conductive trace formation.

Background

Microfluidic devices, often referred to as flow cells, provide very precise means to carry out complicated biochemical reactions to acquire important chemical and biological information. Among other advantages, microfluidic systems reduce the required number of samples and quantities of reagents employed, shorten the response time of reactions, and decrease the amount of biohazard waste for disposal. First developed in the 1990s, initial microfluidic devices were fabricated in silicon and glass using photolithography and etching techniques adapted from the microelectronics industry. Many current microfluidic devices made using this method of fabrication are constructed from plastic, silicone or other polymeric materials, e.g. polydimethylsiloxane (PDMS). Such devices are generally expensive, inflexible, and difficult to construct.

Use of a tape interlayer to form the necessary microfluidic channels between two substrates was developed to reduce cost and complexity of fabrication. Typically a double-sided tape is used between two transparent substrates, which consists of a carrier material with an adhesive layer on the top and bottom and a removable liner covering the adhesive layers. Preferred double-sided tapes for all the embodiments described herein include double-sided silicone tape 3M 96042 or double-sided acrylic/silicone tape 3M 9731, but the choice of tape is dependent on the materials being used.

Microchannels are created by cutting out parts of the double-sided tape and covering it with a sheet of material—glass is preferable for the base, plastics can alternatively be used as the top or bottom cover. Microchannels can be created in plastics or other materials by embossing, etching, or any structuring method. Any number of microfluidic device components can be included on the tape. These might include, for example, microchannels, microvalves or other pneumatic elements, diffusion chambers, manifolds, holes that connect one layer to another (vias), inlet and outlet ports, and other microfluidic device components.

Conventional flow cell fabrication via molding, etching, and bonding is more expensive (both in required tooling and processing) and has longer lead time. In many cases, bonding methods to enclose the flow cell require high temperatures which prevent the use of many surface coatings and the encapsulation fluids or live cultures.

For prior art involving tape, no prior art fabrication methods provide capability for high precision formation of the flow channels. Additionally, imperfections in the tape as adhered to the substrates is aesthetically displeasing. In applications where the tape bonding to the substrates does not provide sufficient sealing no prior art technique is available to economically provide such sealing. Further, in many cases where electrical contact with the flow channels is needed, external leads must be employed. Finally, the prior art fabrication methods with tape cannot be accomplished on wafer level processing due to issues dicing the components on a wafer containing a tape layer.

It is therefore desirable to provide an apparatus and method to obtain high precision in flow channel shaping, provide visual masking to hide imperfections in the tape, provide additional room temperature bonding of substrate edges to obtain better channel dimensional properties or a fast customization of the flow cell. Additionally it is desirable to provide integral electrical leads to the flow cell. Further it is desirable to provide on wafer level processing for dicing the components on a wafer containing a tape layer.

SUMMARY

Embodiments disclosed herein provide a flow cell having a first substrate with a metal layer on one surface. A tape layer having flow channels is adhered to the first substrate. A second substrate having a second metal layer on one surface is adhered to the tape layer opposite the first substrate. At least one of the first and second metal layers includes mating cutouts to at least partially expose the flow channels.

The embodiments disclosed provide a method for fabrication of a flow cell wherein a substrate is provided with a deposited metal layer on one surface. A tape layer is adhered to the substrate. The metal layer is etched prior to or after taping or otherwise formed to include mating openings for viewing flow channels. A mating substrate is provided with a second deposited metal layer on one surface. The mating substrate may contain holes that connect to the flow channels. The second metal layer may be etched or otherwise formed to include mating openings for viewing the flow channels. The mating substrate is then aligned with and bonded to the tape layer.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide methods and apparatus for fabricating a taped interlayer flow cell. None of the prior art use a laser to obtain high precision, have a metallization layer to hide the imperfections in the tape, use a removable tape (UV release), or combine a standard well with a room temperature bonded edges to obtain better channel dimensional properties or a fast customization of the flow cell. Use of UV or thermally releasable tape also allows the flow cell to be easily disassembled, which may be advantageous for certain applications. Also, adding electrical leads to the flow cell is a challenge and normally accomplished with external leads. Finally, the prior art fabrication methods with tape cannot be done on wafer level processing due to issues dicing the components on a wafer containing a tape layer.

Figure 1:
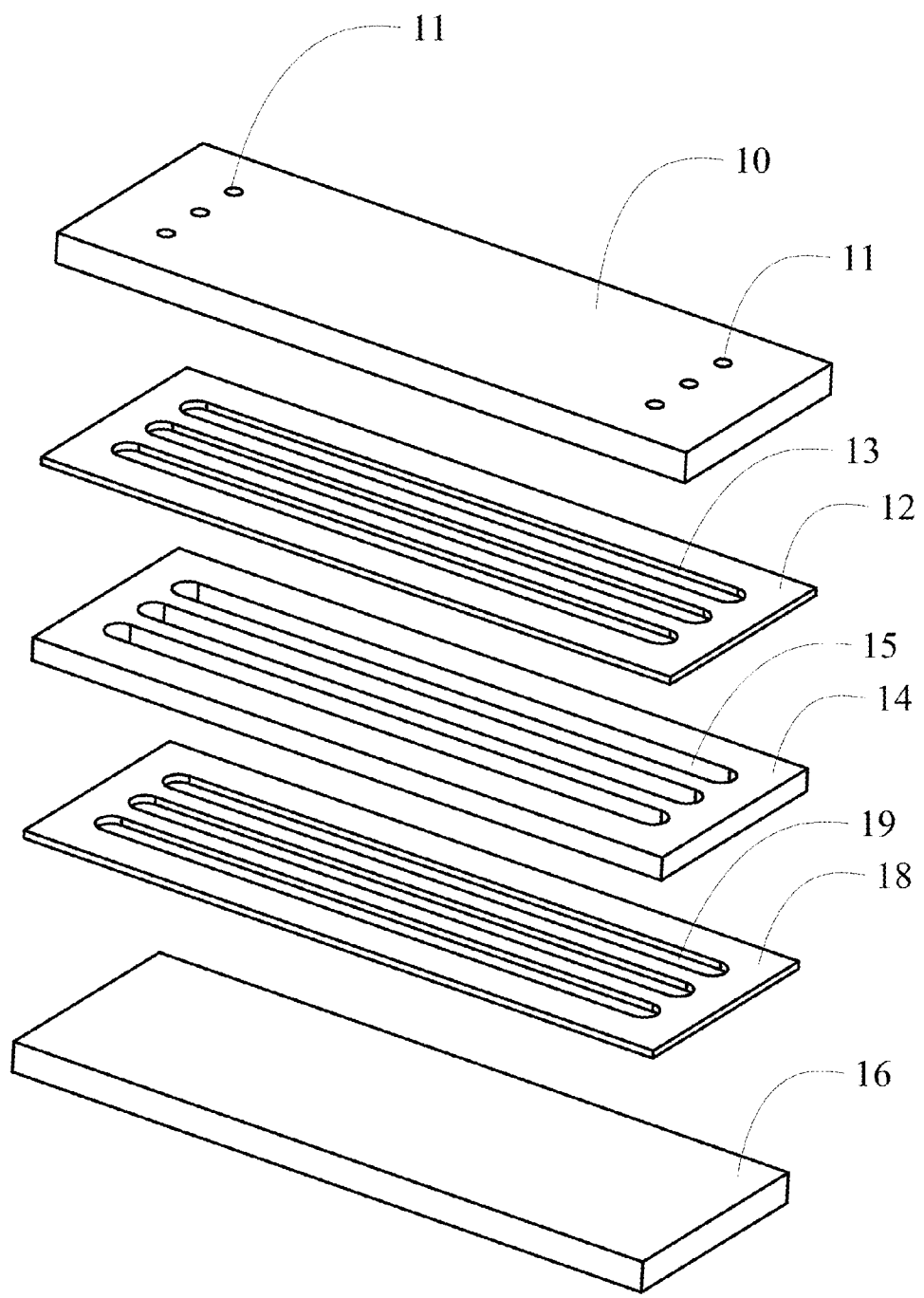
FIG. 1 is an exploded perspective representation of one embodiment.

Referring to the drawings, FIG. 1 shows a first embodiment of a flow cell having a first or top substrate 10 with one or more inlet/exit holes 11. A metal layer 12 is deposited on an upper or lower surface of the first substrate (a lower surface deposition being shown in FIG. 1). A tape layer 14 with one or more laser cut flow channels 15 has double sided adhesive to adhere to the metal layer 12 on first and second substrate (to be described subsequently). The metal layer 12 has mating cutouts 13 sized to expose the flow channels 15. With the tape layer adhered to the metal layer or, in embodiments with the metal layer on an upper surface of the first substrate, the first substrate, an enclosed flow cell running between the inlet/exit ports 11 is created. The tape layer 14 may have a temporary cover layer that can be removed to expose the adhesive as necessary. The substrate 10 is transparent to allow viewing of the flow channel through the cutouts 13 in the metal layer 12 and may be also be predominantly transparent to a predetermined wavelength of a laser employed for processing as will be described subsequently, which will prevent excessive heat being generated at the interface.

Figure 2:
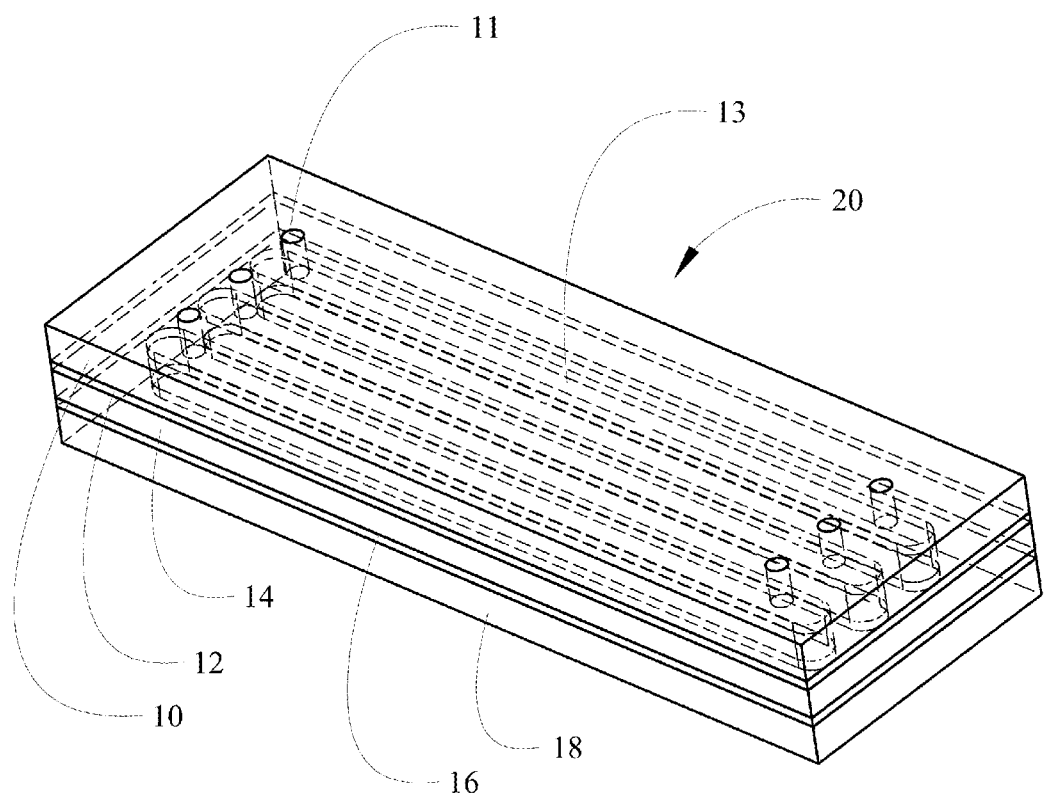
FIG. 2 is a perspective representation of the embodiment of FIG. 1 as assembled.

A second or bottom substrate 16 has a second metal layer 18 deposited on an upper or lower surface (an upper surface deposition being shown in FIG. 1). For the embodiment shown, the second metal layer incorporates cutouts 19 sized to expose the flow channels 15 and the substrate 16 is also transparent to allow viewing of the flow channels 15. The double sided adhesive on the tape layer 14 adheres to either the metal layer 18 or the substrate 16 depending on the surface on which the metal layer is deposited. For exemplary embodiments, the first substrate 10 and second substrate 16 may be glass, silicon, ceramic, plastic, or similar transparent materials. The metal layers 12, 18 are typically chromium for glass substrates but may employ alternative metals. The tape layer 14 is a flexible PVC with synthetic acrylic adhesive bonded to both sides, similar to semiconductor wafer dicing tape supplied by companies like Lintec or Semiconductor Equipment Corporation. The tape layer may alternatively be masking tapes made of Kapton polyimide or polyester or have a silicon adhesive In the assembled condition as shown in FIG. 2, the flow cell 20 allows viewing of the flow channels through the cutouts in the first and second metal layers. The tape layer with double sided adhesive bonds with both substrates. The metal layers on the substrates cover the adhesive attachment of the tape layer to the substrates thereby providing aesthetic masking of any imperfections in the adhesive such as bubbles, striations or graininess that would be visible through the transparent substrates. The cutouts 13 and 19 may be sized and shaped substantially identically to the flow channels 15 in the tape layer or may be undersized to mask a portion of the flow cell. The cutouts may be formed in the metal layers on the substrates prior to assembly of the substrates, or they may be formed after assembly by running an etchant through the completed flow cell channels. Using undersized cut outs or forming the cutouts after assembly eliminates the need for exact alignment of the cut outs to the flow channels. Lateral masking across the flow channels may be employed for process marking or other visual functions associated with the flow cell.

Figure 3:
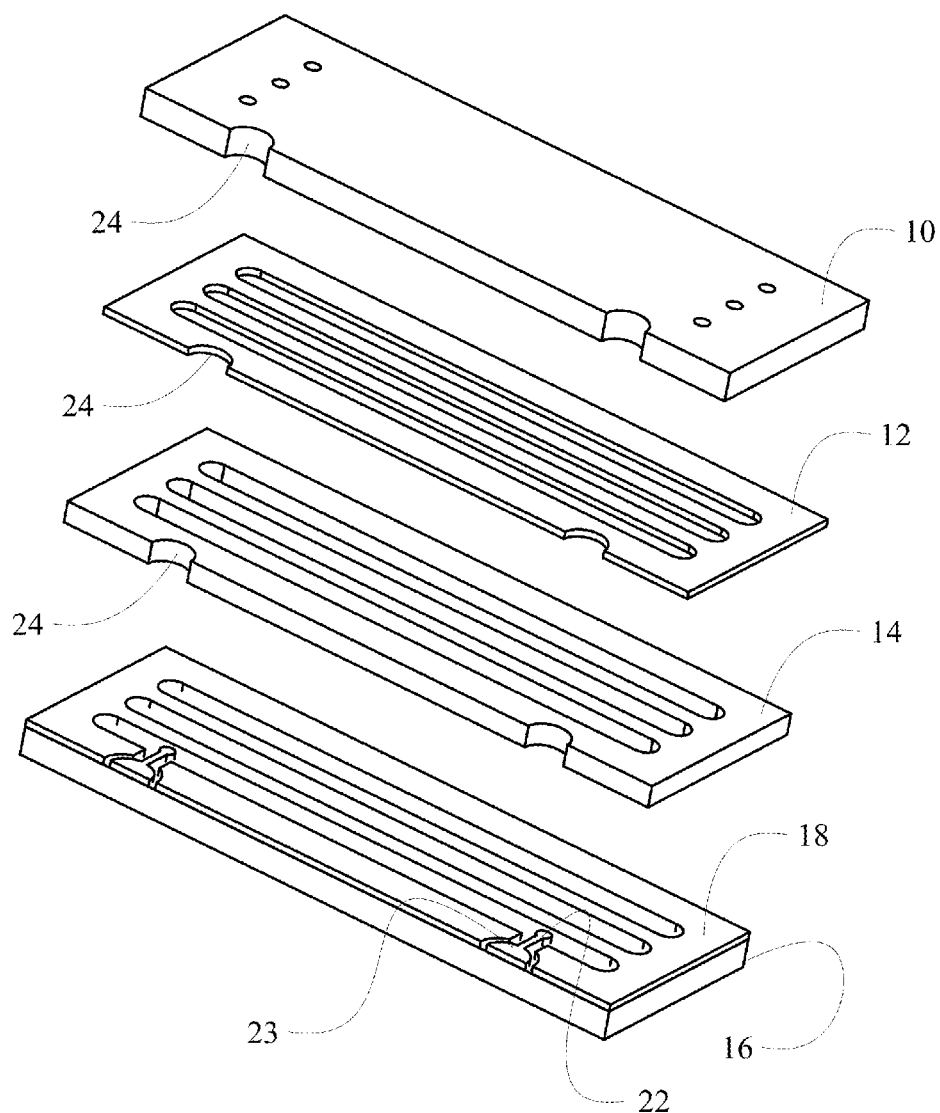
FIG. 3 is an exploded perspective representation of a second embodiment incorporating integral conductive elements.
Figure 4:
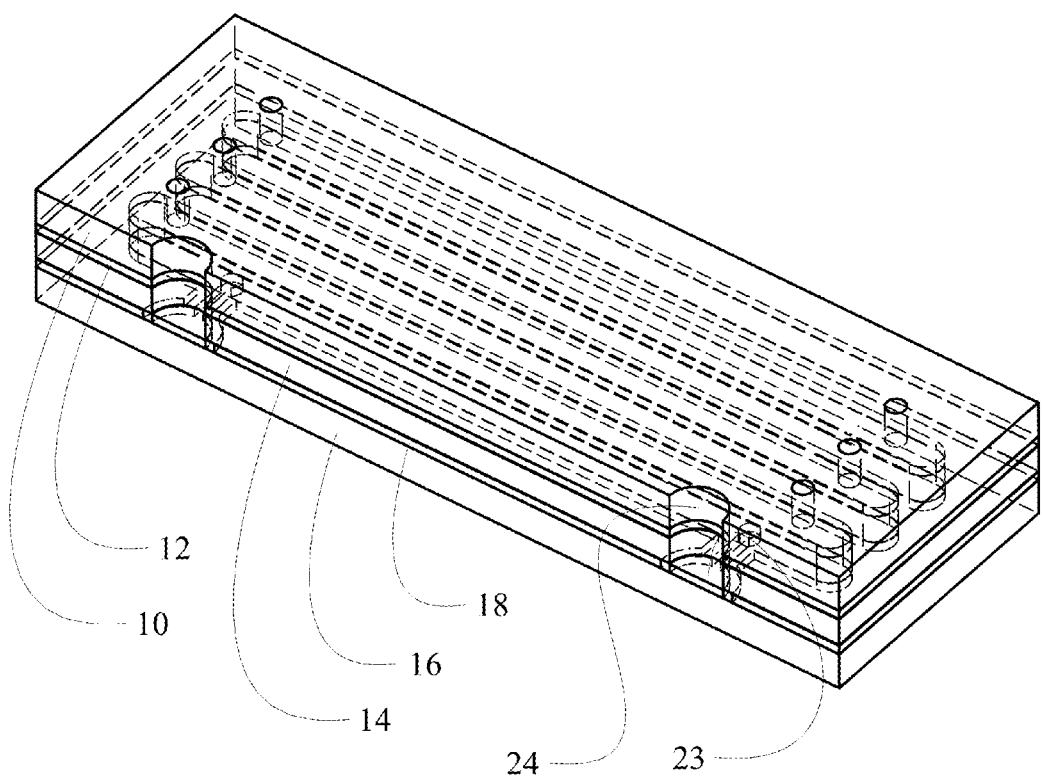
FIG. 4 is a perspective representation of the embodiment of FIG. 3 as assembled.

The metal layers may additionally provide integral electrical conductors for process associated with the flow channels as shown in FIGS. 3 and 4. The metal layers 12, 18 may be deposited on the substrates and structured by etching or laser processing to provide the cutouts 13, 19. During that processing, electrical leads 22 may be formed for contact with one or more of the flow channels 15. For the embodiment shown, the leads are present in the second metal layer 18 deposited on the second substrate 16. As shown in FIG. 3, the leads 22 may be attached to contact pads 23 for external electrical connection. While two simple leads for one channel are shown in FIG. 3, multiple leads extending from multiple sides of the flow cell may be provided and conductors etched within the metal layers for isolated interconnection between or around flow channels. Cutouts 24 are provided in the tape layer 14, upper metal layer 12 and top substrate 10 to expose the contact pads 23 for electrical connection with external circuitry. The tape layer 14 provides insulation between the first metal layer 12 and second metal layer 18 for embodiments in which the metal layers are on interior surfaces of the substrates.

Figure 5:
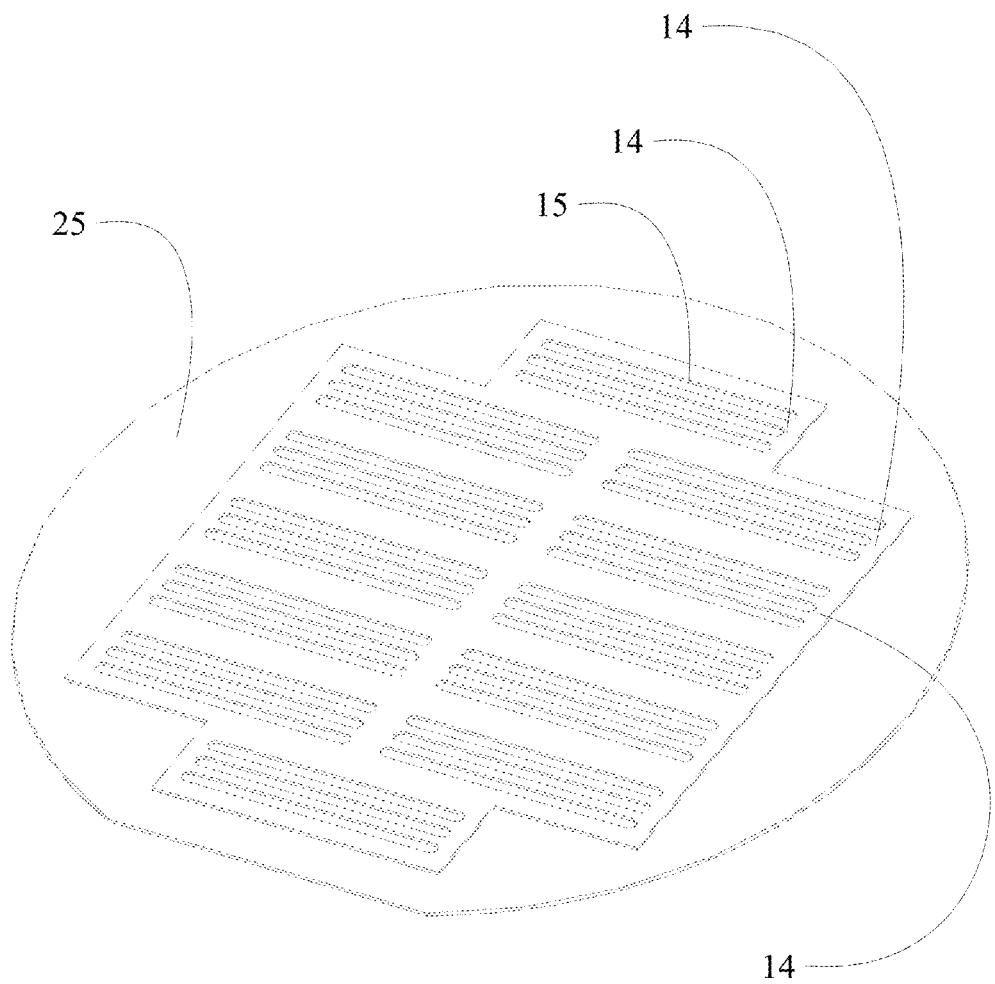
FIG. 5 is a perspective representation of a wafer with tape elements having laser cut features.
Figure 7:
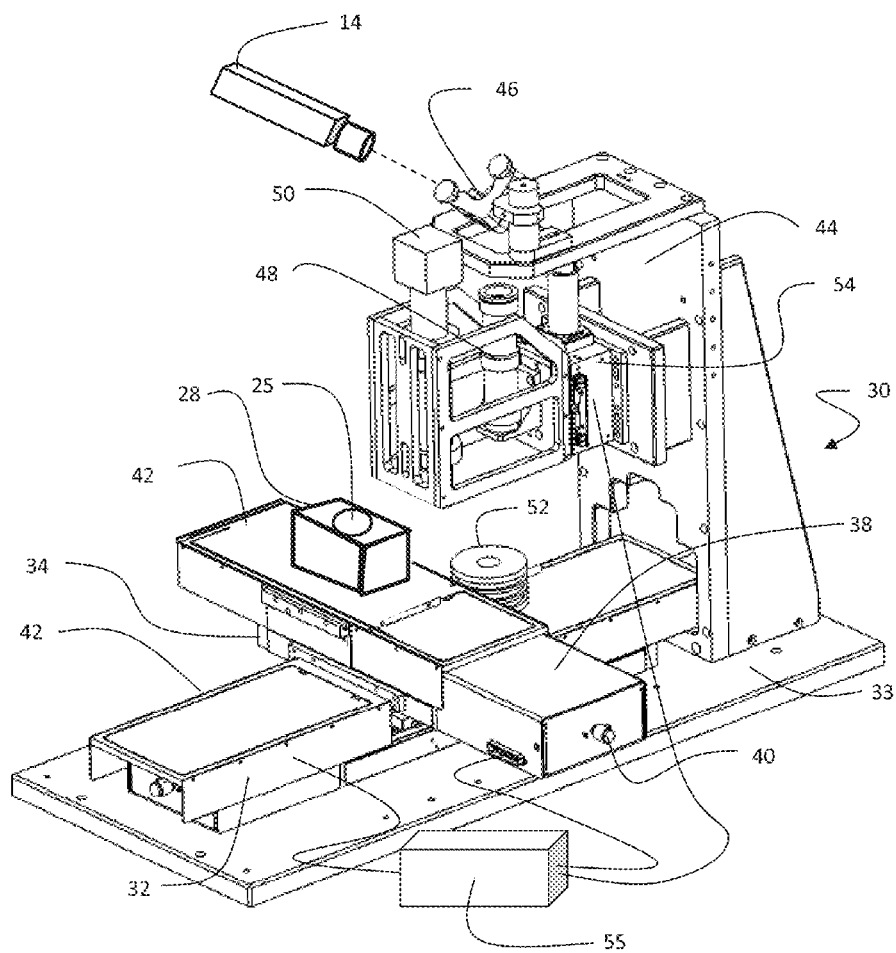
FIG. 7 is a perspective view of an exemplary laser cutting station.

Processing of the tape layer for creation of the flow channels may be accomplished employing a wafer 25 of the substrate material, which may contain a plurality of individual chips that are later diced into separate units as shown in FIG. 5. For the embodiment shown a round wafer is employed and tape adhered to the water is initially cut leaving a pattern of multiple tape layers 14. FIG. 5 is shown with the excess tape removed. The wafer 25 is put in a fixture 28 mounted to the x axis and y axis motion stage on a laser bonding machine as disclosed in copending application Ser. No. 13/291,956 filed on Nov. 8, 2011 entitled ROOM TEMPERATURE GLASS-TO-PLASTIC AND GLASS-TO-CERAMIC/SEMICONDUCTOR BONDING as shown in FIG. 7. The fixture 28 can use a vacuum chuck or any comparable means to clamp the substrate work piece. A positioning system 30 incorporates an x-axis motion stage 32 mounted on a base 33 and a y-axis motion stage 34 mounted to the x-axis mounting stage. For the embodiment shown, a substrate alignment fixture 28 is mounted on the y-axis motion stage. However, in alternative embodiments, the motion stages may be reversed in vertical stacking and the alignment fixture mounted on the x-axis stage. Each motion stage has a drive motor 38 with associated screw drive 40 or similar translation mechanism. Covers 42 shield the operating elements of the motion stages for operator safety. A gantry 44 provides support for alignment optics 46 for the laser 14, and for a z-motion stage, that carries final focusing optics 48, camera 50 and other instrumentation systems as required for monitoring and controlling the bonding operation. For the embodiment shown, a power meter 52 is mounted to the x-axis motion stage to be positioned under the laser optical train for measurement and/or calibration of laser power before movement of the alignment fixture under the laser optics for tape cutting. In the embodiment shown, a z-axis motion stage 54 is provided for vertical positioning of the optical and measurement systems with respect to the alignment fixture. A computer controller 55 is programmable for translation of the x-axis, y-axis and z-axis notion stages for translation of the laser on the work piece. A single laser may be employed for illuminating multiple substrate work pieces in individual positioning systems by employing beam splitters and focusing optical trains to the multiple positioning systems. It is also possible to replace the fixed lens with an f-theta lens with an X-Y scanner and Z-auto-focus either by itself or in conjunction with a large travel X-Y positioning system.

The laser is focused used on the tape layer, and the stage is traversed to cut precise flow channels 15. The laser may ablate the tape creating the flow channels or the laser may cut an outline of the channels and then the inner portion of the outline is subsequently removed from the substrate. For embodiments as disclosed previously and described with respect to FIGS. 1-4, a second substrate wafer is then aligned with the first and bonded to the taped side of the first substrate wafer, thereby enclosing or capping the flow cells. Either prior to or after these processing steps, one or both substrates may have through holes (manufactured by any means) located at precise locations to create inlets and exits of the flow cell.

Figure 6:
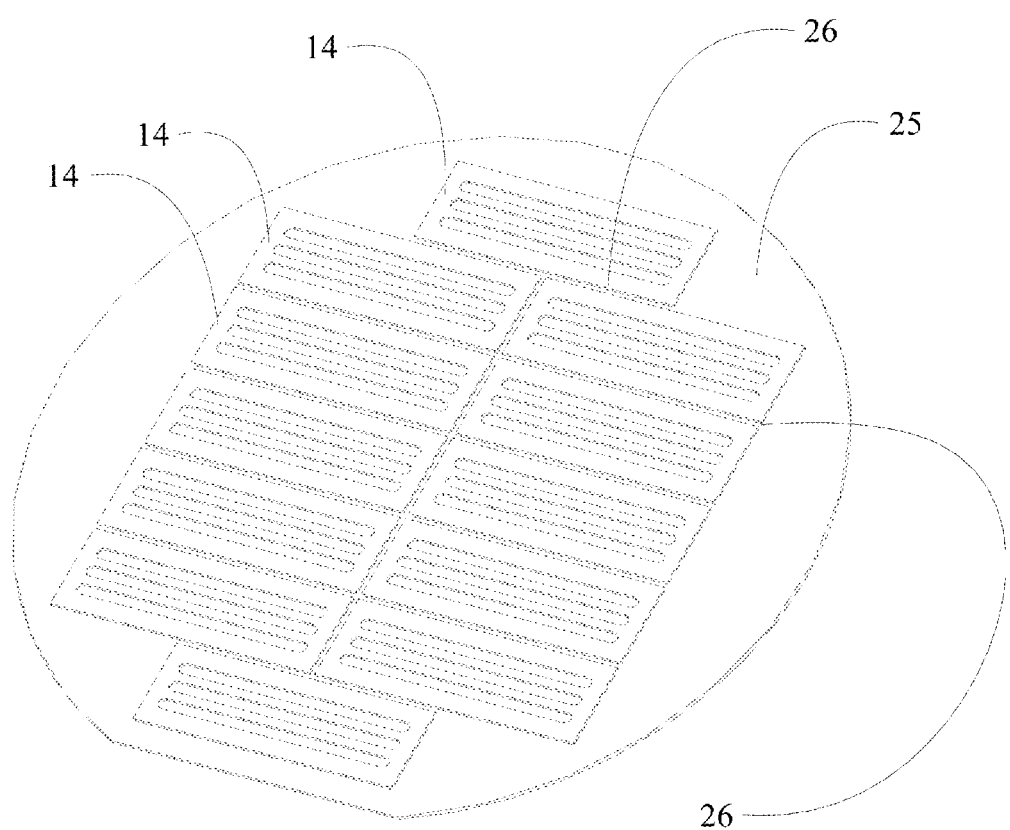
FIG. 6 is a perspective representation of the wafer of FIG. 5 with the tape elements separated by laser cut part lines for dicing.

The embodiments disclosed allow dicing the tape inner layer flow cells from a wafer containing multiple chips. The typical method is using a dicing saw. However, in the case of a flow cell constructed with a tape inner layer, the tape can create a seal with the cutting blade which restricts cooling fluid from flowing into the kerf and causes the blade to overheat. In the proposed method, the tape can be removed from the dicing lines 26 as shown in FIG. 6 to create individual tape layer masks prior to the dicing operation via laser ablation or laser cutting in a similar fashion used to create the flow channels 15 and at the same time. This leaves a clear path for the dicing saw and cooling fluid. In an alternative embodiment, the dicing lines may have sufficient width to space the tape layer masks for placement in a well in a substrate as will be described subsequently. An additional processing step would be to the pre-dice the wafer prior to application of the tape, and leave small areas (tabs) to hold the wafer together as a monolithic unit. After application of the tape layer and processing as described to create the flow channels 15 and dicing lines 26, only the small tab areas will need to be cut to separate the individual chips. The small tab areas can be cut with the laser either during or after the tape cutting process thereby eliminating the saw cutting of the completed wafer.

Figure 8:
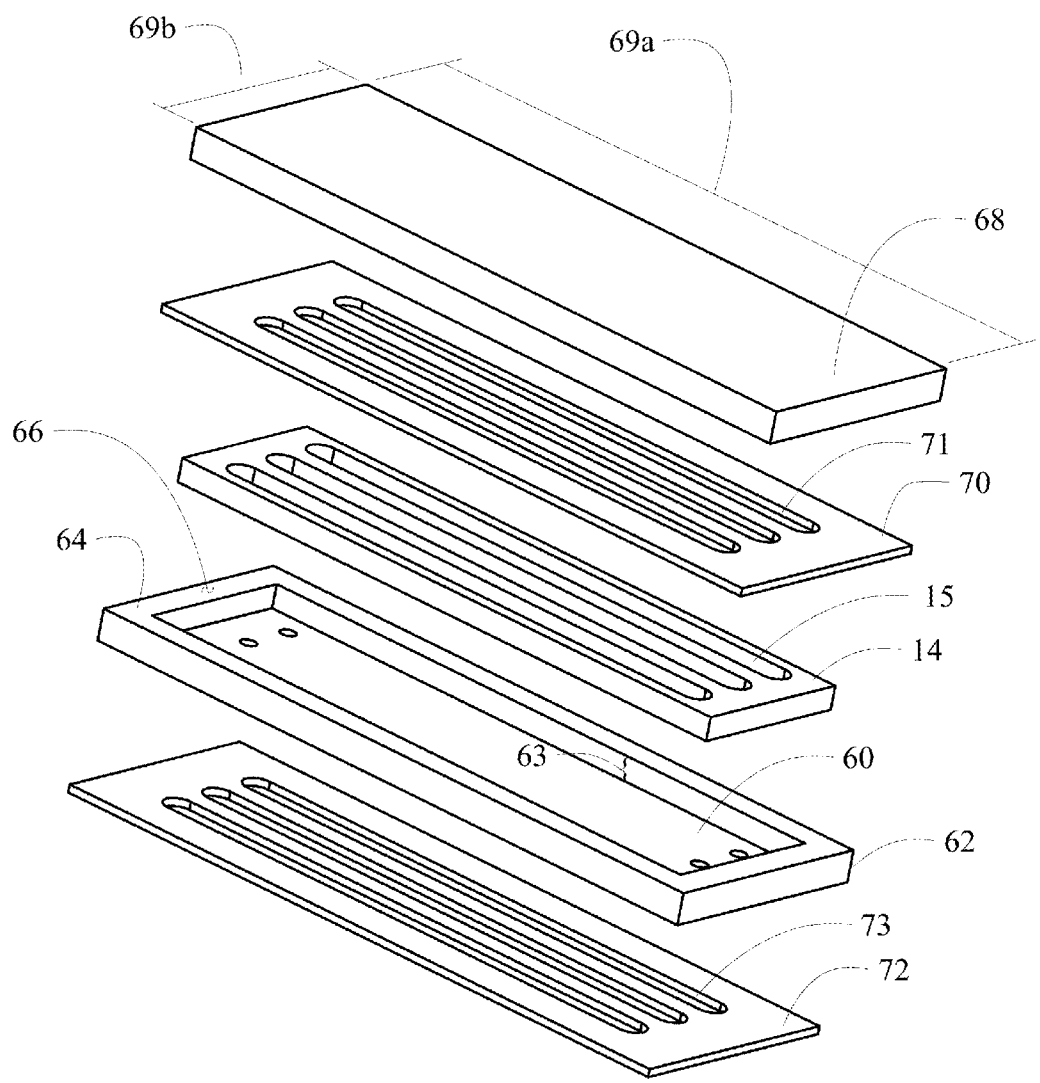
FIG. 8 is an exploded perspective representation of a third embodiment incorporating a well in one substrate which receives the tape layer.

As shown in FIG. 8, in another embodiment of the taped flow cell, the tape layer 14 is received inside a well 60 in a bottom substrate 62. The well is designed such that the height 63 of the well 60 is a precise dimension that defines the desired height of the flow cell. The well height would preferably be slightly less than the thickness of the tape layer 14, such that it provides some compressive force on the tape to improve adhesion and pressure capacity of the flow cell upon assembly as described subsequently. The outside edges 64 of the bottom substrate 62 surrounding the well 60 would also provide a flat surface 66 which can be laser bonded to the capping substrate 68 which has length 69a and width 69b sufficient to overlap the edges 64 in the lower substrate 62. The flat surface 66 on the edges 64 insures that the top and bottom surfaces of the flow channels 15 are parallel to each other within a significantly tighter tolerance than a flow cell fabricated with tape alone as the inner layer. The capping substrate 68 has a metal layer 70 on an inner surface to engage the tape layer 14 and the edges 64 of the bottom substrate 62. A room temperature laser bond may then be established at the interface of the mated lower and capping substrates, employing the metal layer 70 to create the localized plasma as described in application Ser. No. 13/291, 956. Additionally electrical leads may be incorporated in the bond as described therein. The metal layer 70 extending over the flat surface 66 on the edges 64 provides a boundary region surrounding the well 60 for creation of the localized plasma. For the embodiment of FIG. 8, a second metal layer 72 may be deposited on the outer flat surface of the lower substrate 62. As previously described with respect to the prior embodiments, mating cutouts 71, 73 may be etched or otherwise formed in the respective metal layers 70, 72 for viewing of the flow channels 15 created in the tape layer 14.

Figure 9:
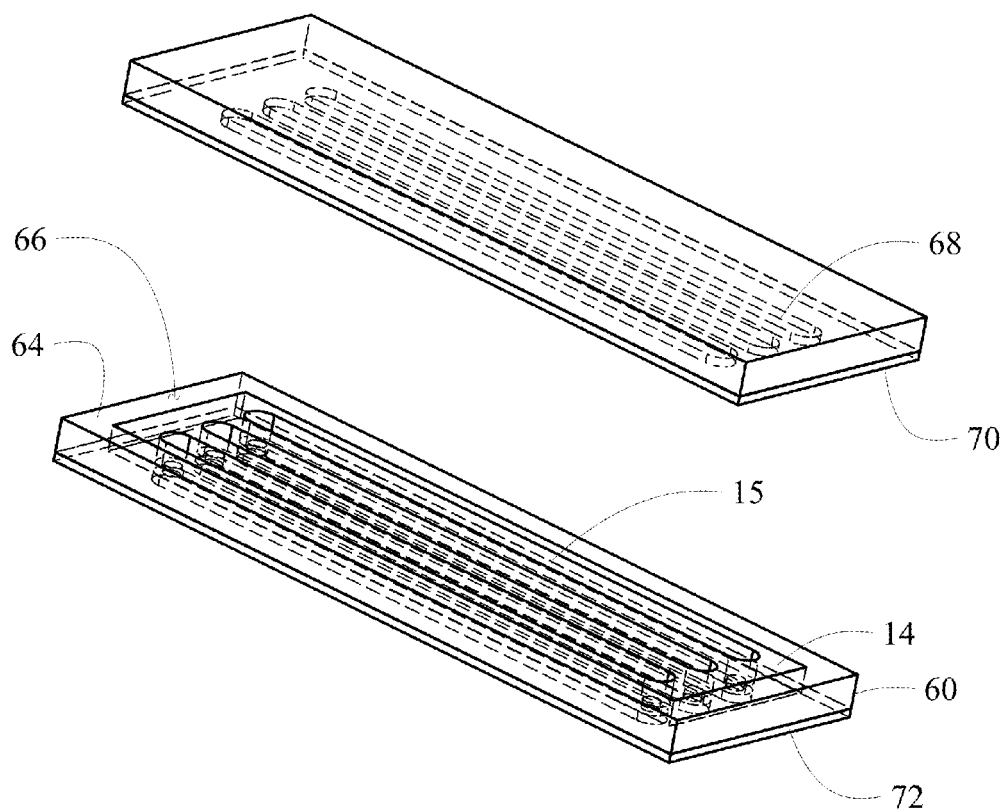
FIG. 9 is a perspective representation of the embodiment of FIG. 8 as partially assembled.
Figure 10:
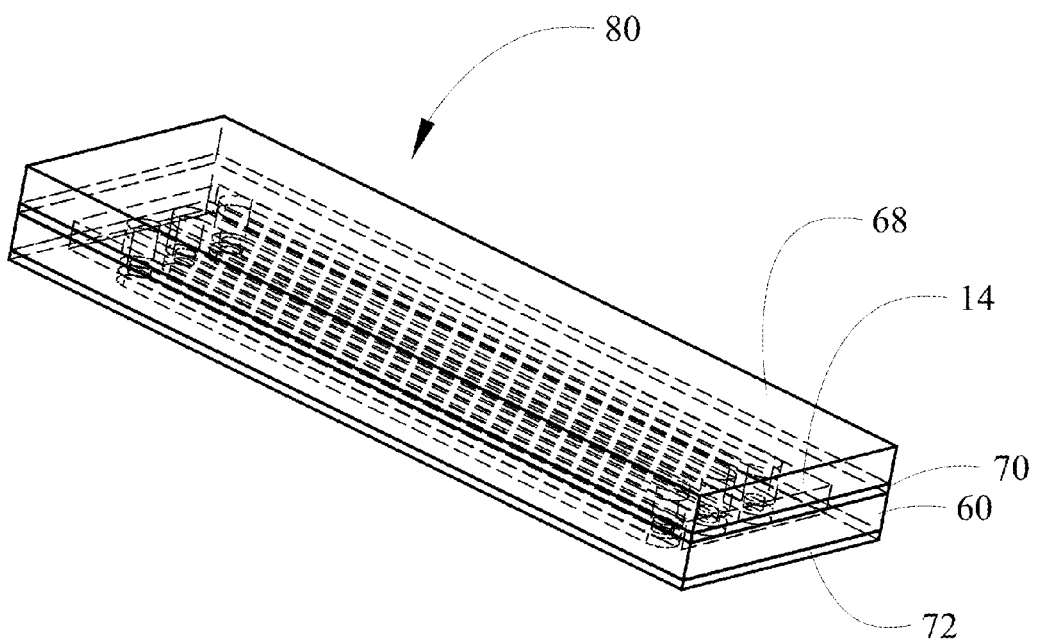
FIG. 10 is a perspective representation of the embodiment of FIG. 8 as fully assembled.

The partially assembled view shown in FIG. 9 demonstrates the tape layer 14 received in the well 60 with the metal layer 70 extending to the full lateral length and width dimensions of the capping substrate 68 and the metal layer 72 covering the outer surface of the lower substrate 60. FIG. 10 shows the flow cell 80 as completely assembled and laser bonded. The metal layer 70 may be etched to provide electrical contacts as previously described with respect to FIGS. 3 and 4.

Figure 11:
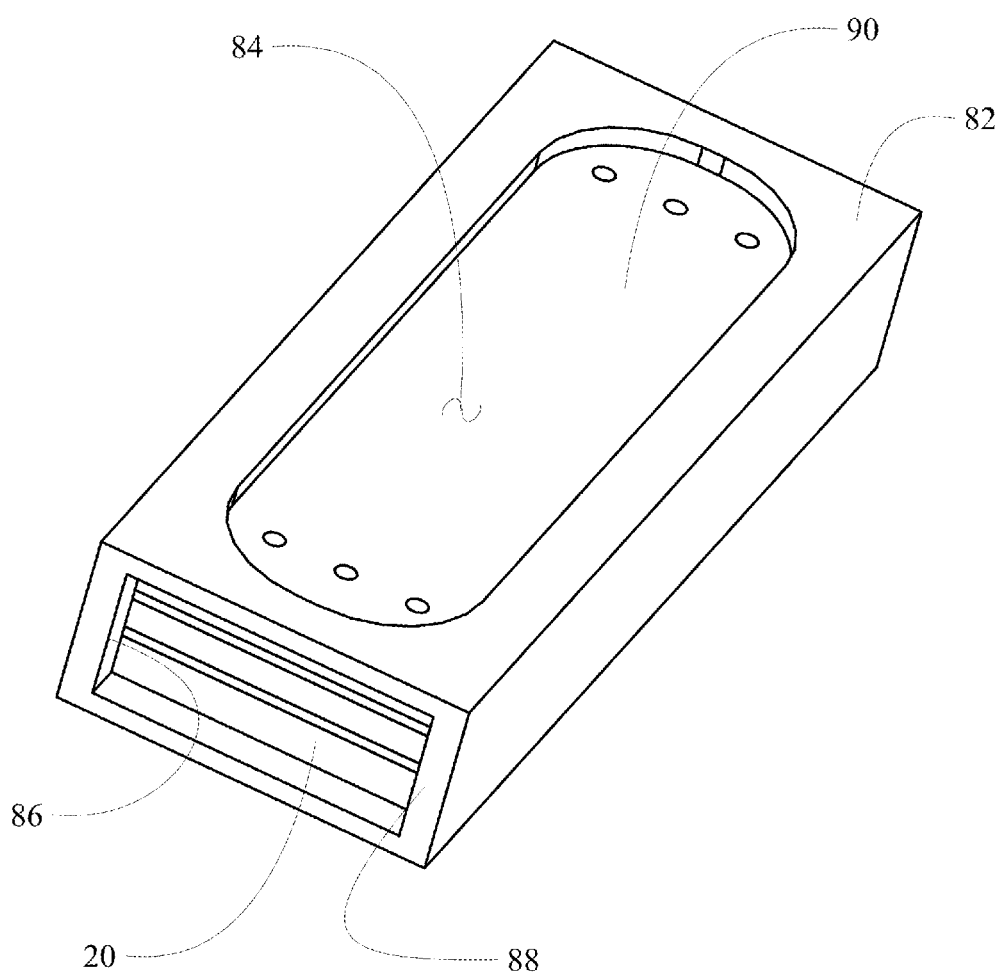
FIG. 11 is a perspective view of a chip enclosure adapted to receive a flow cell embodiment as shown in FIG. 1.
Figure 12:
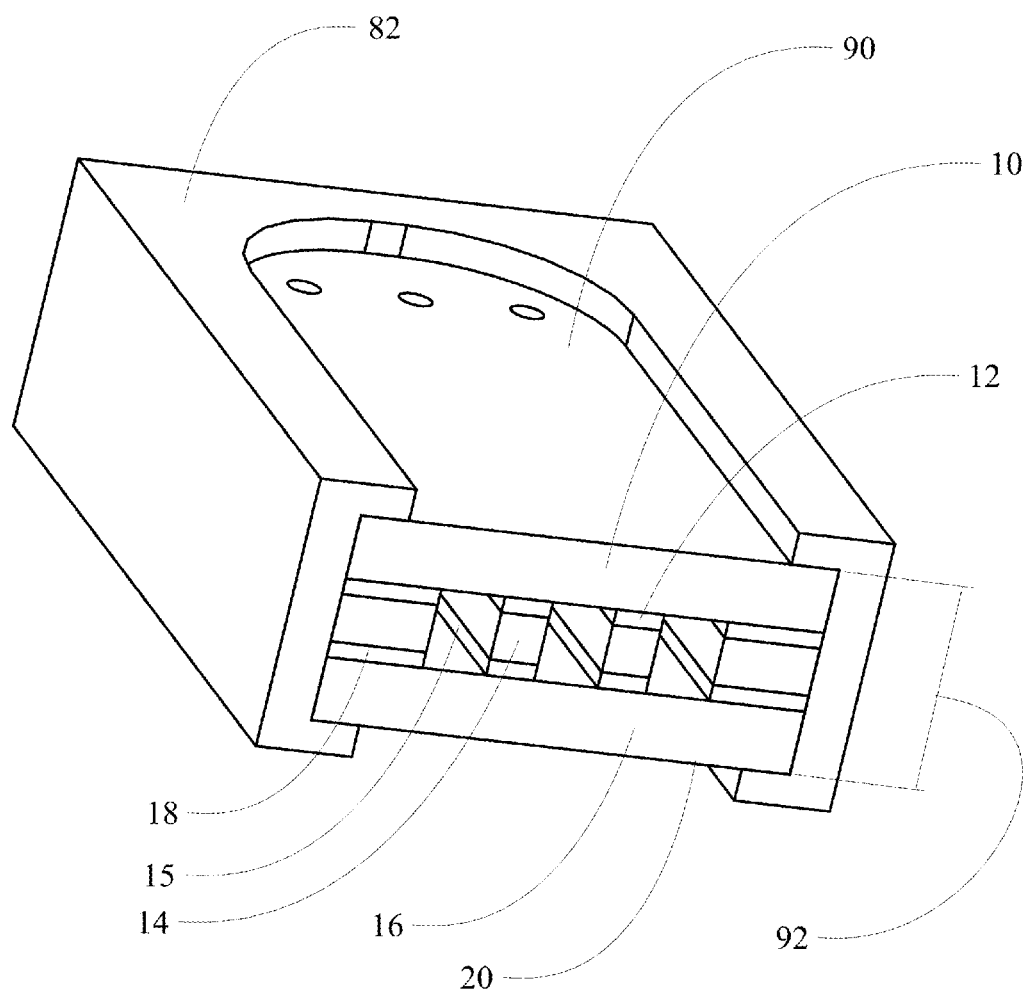
FIG. 12 is a sectioned perspective view of the chip enclosure of FIG. 11.

For embodiments as disclosed, and described with respect to FIGS. 1, 2, 3 and 4, additional support for the flow cell beyond the strength of the adhesive bond between the tape layer and substrates may be desirable. FIG. 11 shows a chip enclosure 82 having a rectangular cavity 84 with an opening 86 in one side 88 receives the flow cell 20. An aperture 90 in one or both of the top and bottom of the chip enclosure 82 allows viewing of the flow channels. As shown in FIG. 12, the cavity 84 has a height 92 corresponding to the thickness of the assembled flow cell 20. The height may be designed to require slight compression of the flow cell for insertion into the cavity to enhance the sealing of the flow channels 15 by compressing the substrates 10, 16 (with the metal layers 12, 18) firmly against the tape layer 14. The chip enclosure 82 enclosure can be a single monolithic piece (machined or molded) or two halves permanently bonded/bolted together), and it can be reusable. It can be of any material, preferably a polymer or metal (for example Delrin, polyurethane, aluminum or stainless steel).

Figure 13A:
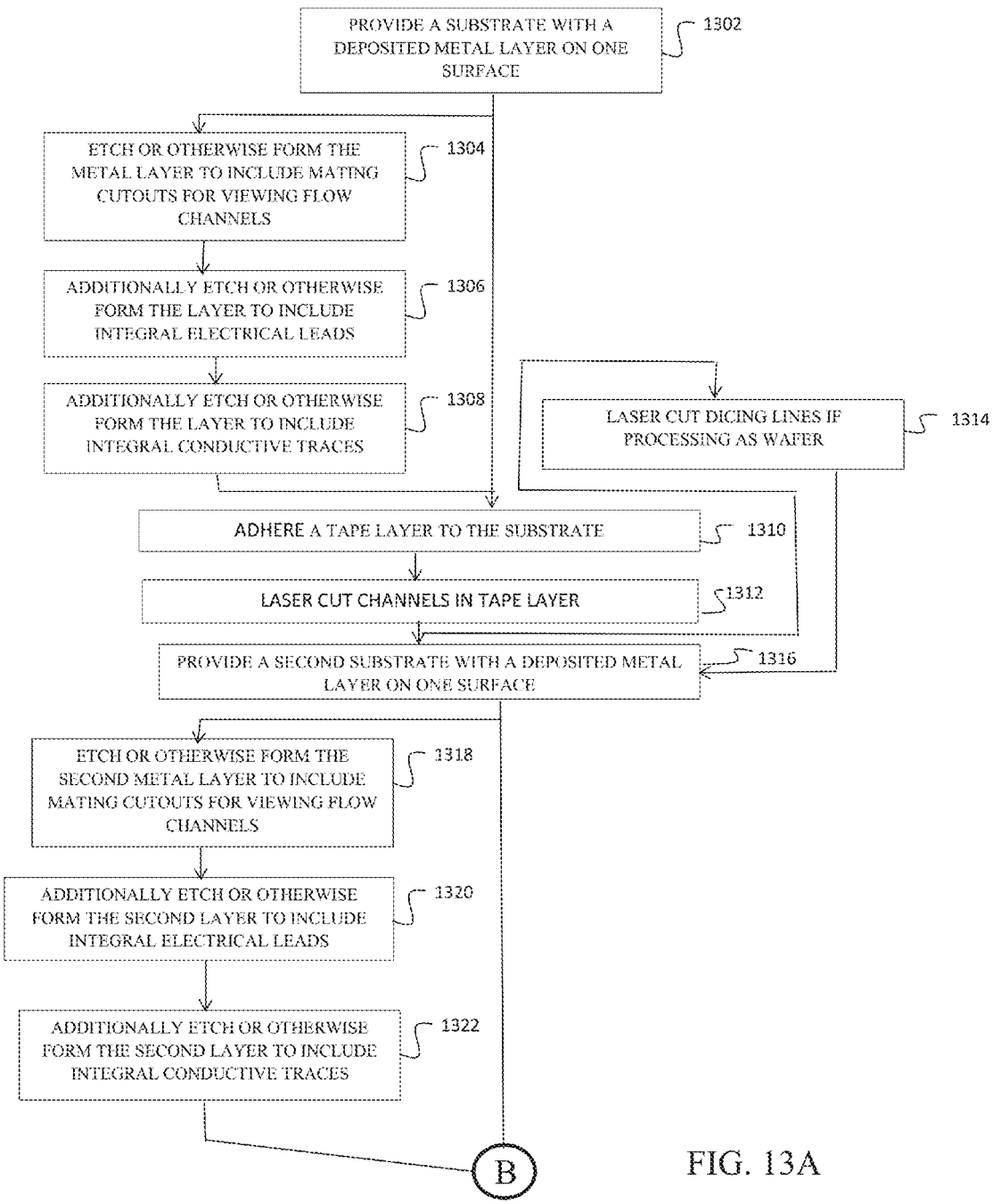
FIGS. 13A and 13B are a flow charts demonstrating a method of assembly of a flow cell for the embodiments described.
Figure 13B:
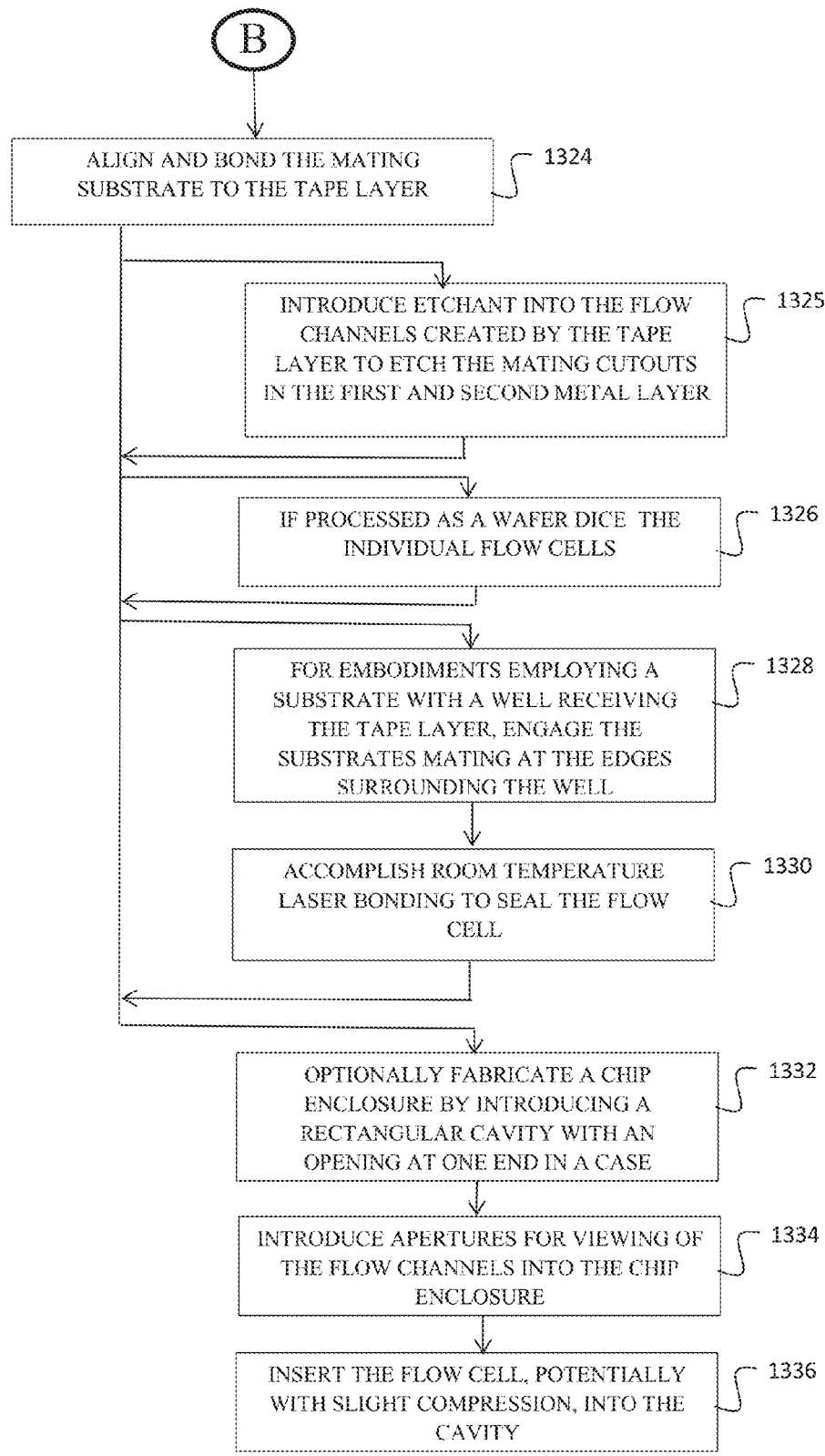

The embodiments described provide a method for fabricating a flow cell as shown in FIGS. 13A and 13B. A substrate is provided with a deposited metal layer on one surface, step 1302. The metal layer may be etched or otherwise formed to include mating cutouts for viewing flow channels, step 1304. The layer may additionally be etched or otherwise formed to include integral electrical leads, step 1306, and, in certain cases, conductive traces, step 1308. A tape layer is adhered to the substrate, step 1310. The tape layer is then laser cut to form flow channels, step 1312. In a wafer processing approach, dicing lines may additionally be cut for separation of flow cells on the wafer, step 1314. A mating substrate is provided with a second deposited metal layer on one surface, step 1316. The second metal layer may be etched or otherwise formed to include mating cutouts for viewing the flow channels, step 1318. The second metal layer may additionally be etched or otherwise formed to include integral electrical leads, step 1320, and, in certain cases, conductive traces, step 1322. The mating substrate is then aligned with and bonded to the tape layer, step 1324. In an alternative sequencing, the substrate, tape layer and mating substrate may be fully assembled without having the cutouts previously structured and an etchant introduced into the flow channels created by the tape layer to etch the mating cutouts in the first and second metal layer, step 1325. If processed as a wafer, the individual flow cells are then diced, step 1326. Alternatively, dicing of the first wafer may occur after laser cutting of the tape flow channels and dicing lines and individual mating substrates may then be applied to the individual cell masks. For embodiments employing a substrate with a well receiving the tape layer, the substrates mating at the edges surrounding the well are engaged, step 1328, and room temperature laser bonding is accomplished to seal the flow cell, step 1330. If a flow cell as described with respect to FIGS. 1 and 2 is employed, an optional chip enclosure may be fabricated by introducing a rectangular cavity with an opening at one end in a case, step 1332. Apertures for viewing of the flow channels may be introduced into the chip enclosure, step 1334. The flow cell is then inserted, potentially with slight compression, into the cavity, step 1336.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A flow cell comprising:
   a first substrate having a metal layer on at least one surface;
   a tape layer having adhesive on two surfaces and having flow channels adhered to the first substrate;
   a second substrate having a second metal layer on at least one surface, A substrate aid tape layer having a thickness at least equal to a depth of the well, the first substrate having edges extending said second substrate and first substrate adhered to the tape layer on opposite ones of the two surfaces, wherein at least one of said first and second metal layers includes mating cutouts to at least partially expose the flow channels configured to create localized plasma during room temperature laser bonding.

2. The flow cell as defined in claim 1, wherein the flow channels in the tape layer are laser cut.

3. The flow cell as defined in claim 2, wherein said first substrate comprises a plurality of first substrates on a wafer and the tape layer is adhered to the wafer, said tape layer being laser cut and adapted form a plurality of tape layer masks.

4. The flow cell as defined in claim 3, wherein the tape layer masks are separated by laser cut dicing lines.

5. The flow cell as defined in claim 1, wherein the first metal layer further comprises integral electrical leads.

6. The flow cell as defined in claim 5, wherein the second metal layer, tape layer and second substrate further comprise lead cutouts revealing contact pads for the integral electrical leads.

7. The flow cell as defined in claim 1, wherein the adhesive on the two surfaces of the tape layer is releasable adhesive.

8. The flow cell as defined in claim 1, wherein the mating cutouts in the metal layer are etched.

9. The flow cell as defined in claim 8, wherein the mating cutouts are etched after adhering the second substrate.

* * * * *